US011228504B2

(12) United States Patent
Puttur et al.

(10) Patent No.: US 11,228,504 B2
(45) Date of Patent: *Jan. 18, 2022

(54) SYSTEMS AND METHOD FOR REPLAYING AND DEBUGGING LIVE STATES OF NETWORK DEVICES

(71) Applicant: Juniper Networks, Inc., Sunnyvale, CA (US)

(72) Inventors: Rafik Puttur, Dakshina Kannada (IN); Manoj Nayak, Bangalore (IN); Manoj Namballa, Bangalore (IN)

(73) Assignee: Juniper Networks, Inc, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/077,179

(22) Filed: Oct. 22, 2020

(65) Prior Publication Data

US 2021/0044487 A1  Feb. 11, 2021

Related U.S. Application Data

(63) Continuation of application No. 16/517,053, filed on Jul. 19, 2019, now Pat. No. 10,904,100.

(51) Int. Cl.
*G06F 15/173* (2006.01)
*H04L 12/24* (2006.01)
*H04L 12/26* (2006.01)

(52) U.S. Cl.
CPC ........ *H04L 41/145* (2013.01); *H04L 41/0654* (2013.01); *H04L 41/147* (2013.01); *H04L 43/04* (2013.01)

(58) Field of Classification Search
None
See application file for complete search history.

(56) References Cited

U.S. PATENT DOCUMENTS 10,204,030 B1 * 2/2019 Hockett .............. G06F 11/3624
11,000,771 B1 * 5/2021 Boocher .............. A63F 13/497
(Continued)

FOREIGN PATENT DOCUMENTS

WO  WO-2007094816 A2 *  8/2007 ............. G06Q 30/00

OTHER PUBLICATIONS

Non Final Office Action received for U.S. Appl. No. 16/517,053 dated Jun. 19, 2020, 54 pages.
(Continued)

*Primary Examiner* — Phyllis A Book
(74) *Attorney, Agent, or Firm* — FisherBroyles, LLP

(57) ABSTRACT

A disclosed method may include (1) collecting telemetry data that represents a state of a network device during a live operating session, (2) deriving, from the telemetry data, a set of steps for reproducing the state of the network device during the live operating session based at least in part on a set of rules, (3) generating, based at least in part on the set of steps, a playback decision tree that, upon execution, facilitates (A) reproducing the state of the network device during the live operating session and (B) debugging the state of the network device, and then (4) performing a debug operation that executes the playback decision tree via a network diagnostic tool such as a healthbot. Various other systems, methods, and computer-readable media are also disclosed.

20 Claims, 8 Drawing Sheets

(56) References Cited

U.S. PATENT DOCUMENTS

| | | | |
|---|---|---|---|
| 2007/0245015 A1* | 10/2007 | Raisoni | H04L 43/12 |
| | | | 709/224 |
| 2012/0051229 A1 | 3/2012 | Feldmann et al. | |
| 2013/0018632 A1* | 1/2013 | Field | H04L 67/025 |
| | | | 702/183 |
| 2017/0006135 A1* | 1/2017 | Siebel | H04L 67/10 |
| 2017/0091642 A1* | 3/2017 | Enck | G16H 50/50 |
| 2019/0121889 A1 | 4/2019 | Gold et al. | |
| 2019/0253328 A1* | 8/2019 | Kolar | H04L 41/147 |
| 2019/0287004 A1* | 9/2019 | Bhoj | H04L 41/14 |
| 2020/0265329 A1* | 8/2020 | Thomsen | G05B 13/041 |
| 2020/0327371 A1* | 10/2020 | Sharma | G06N 5/04 |

OTHER PUBLICATIONS

Notice of Allowance received for U.S. Appl. No. 16/517,053 dated Sep. 30, 2020, 19 pages.

Ganchenko et al., "Neural network software diagnosis system of telemetry data", IEEE 7th International Conference on Intelligent Data Acquisition and Advanced Computing Systems, 2013, 9 pages.

* cited by examiner

SYSTEMS AND METHOD FOR REPLAYING AND DEBUGGING LIVE STATES OF NETWORK DEVICES

CROSS REFERENCE TO RELATED APPLICATION

This application is a continuation of U.S. application Ser. No. 16/517,053 filed 19 Jul. 2019, the disclosure of which is incorporated in its entirety by this reference.

BACKGROUND

Network devices (such as routers and switches) are often used to forward traffic within a network and/or across networks. Multiple network devices may be deployed and interconnected over one or more networks. In a traditional configuration, if a problem is encountered on any of the network devices or networks, identifying the error may be difficult due to the complexity and size of the deployment. Different network devices may be configured to address diverse needs and/or identify the cause of the error on a particular network device in an extensive deployment. Unfortunately, determining the proper corrective action to apply to the network flow issue may consume time and resources and/or impair the functionality of the deployment of the network devices until the network flow issue is identified. The instant disclosure, therefore, identifies and addresses a need for additional and improved apparatuses, systems, and methods for replaying and debugging live states of network devices.

SUMMARY

As will be described in greater detail below, the instant disclosure generally relates to apparatuses, systems, and methods for replaying and debugging live states of network devices. In one example, a method for accomplishing such a task may include (1) collecting telemetry data that represents a state of a network device during a live operating session, (2) deriving, from the telemetry data, a set of steps for reproducing the state of the network device during the live operating session based at least in part on a set of rules, (3) generating, based at least in part on the set of steps, a playback decision tree that, upon execution, facilitates (A) reproducing the state of the network device during the live operating session and (B) debugging the state of the network device, and then (4) performing a debug operation that executes the playback decision tree.

Similarly, a system that implements the above-described method may include at least one physical processor configured to execute various modules stored in memory. For example, a system may include (1) a collection module that collects telemetry data that represents a state of a network device during a live operating session, (2) an analysis module that (A) derives, from the telemetry data, a set of steps for reproducing the state of the network device during the live operating session based at least in part on a set of rules and (B) generates, based at least in part on the set of steps, a playback decision tree that, upon execution, facilitates (I) reproducing the state of the network device during the live operating session and (II) debugging the state of the network device, and (3) a debug module that performs a debug operation that executes the playback decision tree.

Additionally or alternatively, the above-described method may be encoded as computer-readable instructions on a non-transitory computer-readable medium. For example, a computer-readable medium may include one or more computer-executable instructions that, when executed by at least one processor of a computing device, may cause the computing device to (1) collect telemetry data that represents a state of a network device during a live operating session, (2) derive, from the telemetry data, a set of steps for reproducing the state of the network device during the live operating session based at least in part on a set of rules, (3) generate, based at least in part on the set of steps, a playback decision tree that, upon execution, facilitates (A) reproducing the state of the network device during the live operating session and (B) debugging the state of the network device, and then (4) perform a debug operation that executes the playback decision tree.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
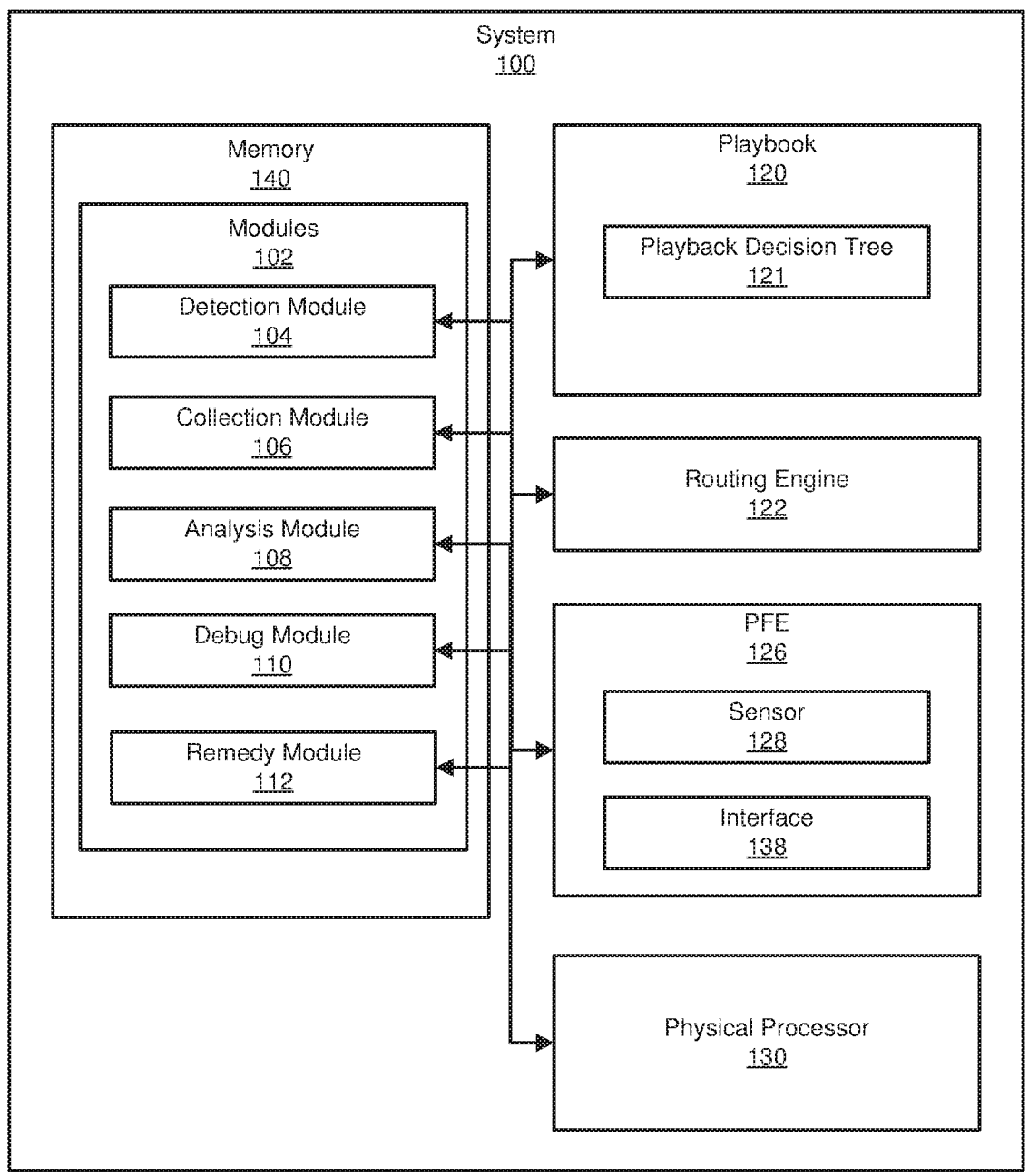
FIG. 1 is a block diagram of an exemplary system for replaying and debugging live states of network devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for replaying and debugging live states of network devices. As be explained in greater detail below, embodiments of the instant disclosure may improve the efficiency of identifying and correcting network flow issues by capturing different types of information when a network flow issue is encountered during a live operating session and then generating a playback decision tree based on the information. An analytics and diagnostics tool (such as a network healthbot) may regenerate or replay the issue encountered during the live operating session using the playback decision tree.

In some embodiments, a playback decision tree may be generated using telemetry data collected from the network device at the time of the network flow issue. Upon detection of a triggering event (e.g., indication from an administrator of the system and/or detection of anomalies in the state of a network device or network), telemetry data may be obtained from one or more network devices associated with the network flow issue and may be assembled into a playback decision tree.

The playback decision tree may be used by an analytics and diagnostics tool to regenerate and/or replay the network flow issue on the network device where the error occurred or on a different device (such as a remote debug device). The network flow issue may be replayed and/or replicated during a debug session to mirror and/or simulate the events that occurred during the live operating session, and/or corrective actions may be identified and taken based on the replay or replication of the network flow issue.

The following will provide, with reference to FIGS. 1, 2, and 4-7, detailed descriptions of exemplary systems and corresponding implementations for replaying and debugging live states of network devices. Detailed descriptions of corresponding computer-implemented methods will be provided in connection with FIG. 3. In addition, detailed descriptions of an exemplary computing system for carrying out these methods will be provided in connection with FIG. 8.

FIG. 1 is a block diagram of an example system 100 for replaying and debugging live states of network devices. As illustrated in this figure, the example system 100 may include one or more modules 102 for performing one or more tasks. As will be explained in greater detail below, the modules 102 may include a detection module 104, a collection module 106, an analysis module 108, a debug module 110, and/or a remedy module 112. Although illustrated as separate elements, one or more of modules 102 may represent portions of a single module or application (such as a network diagnostic tool and/or healthbot).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., intermediate server 202, network devices 206(1)-(N), and/or computing device 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate replaying and debugging live states of network devices. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more playbooks, such as playbook 120. In some examples, playbook 120 may include and/or represent a set of rules for analyzing, filtering, and/or formatting telemetry data. In one example, playbook 120 may be applied to telemetry data to facilitate deriving a set of steps for reproducing device states from the telemetry data. In some embodiments, these rules may be created and/or defined by a user and/or administrator. Additionally or alternatively, these rules may be created and/or defined by an automated process (such as artificial intelligence and/or machine learning). As illustrated in FIG. 1, playbook 120 may also include a playback decision tree 121 that includes various nodes representing different states experienced by the network device during a live operating session. Although illustrated as a single entity in FIG. 1, playbook 120 may include and/or represent multiple playbooks that serve different purposes and/or provide multiple support, reproduction, and/or diagnostic features within system 100.

Example system 100 may also include one or more routing engines, such as routing engine 122. In one example, routing engine 122 may represent and/or refer to a physical device and/or hardware that handles routing procedures, processes, and/or decisions. Routing engine 122 may include one or more Application-Specific Integrated Circuits (ASICs) and/or physical processors. Examples of such processors include, without limitation, microprocessors, microcontrollers, Central Processing Units (CPUs), Field-Programmable Gate Arrays (FPGAs) that implement softcore processors, portions of one or more of the same, variations or combinations of one or more of the same, and/or any other suitable physical processors.

In one example, routing engine 122 may control certain physical and/or virtual interfaces of a network device. In addition, routing engine 122 may include an operating system and/or certain applications that facilitate communication between the network device and other devices within a network. In some examples, routing engine 122 may include a monitoring daemon that monitors and/or manages data of a network device. In one example, the monitoring daemon may monitor and/or manage data read from a PFE and/or notify one or more components and/or devices of a change in device state information. The monitoring daemon may receive, hijack, and/or intercept device state information and may notify one or more entities of changes in device state information.

As illustrated in FIG. 1, example system 100 may also include one or more PFEs (PFEs), such as PFE 126. In one example, PFE 126 may represent and/or refer to a physical device and/or hardware that processes packets by forwarding the same between input and output interfaces. PFE 126 may include one or more ASICs and/or physical processors. Examples of such processors include, without limitation, microprocessors, microcontrollers, CPUs, FPGAs that implement softcore processors, portions of one or more of the same, variations or combinations of one or more of the same, and/or any other suitable physical processors.

In some examples, PFE 126 may include one or more sensors, such as sensor 128. Data from the sensors may be collected and streamed to one or more collectors (e.g., an intermediate server, an analysis server, routing engine 122, data collection service, etc.) through a data collection protocol, such as a telemetry interface, simple network management protocol (SNMP), NETCONF, OpenConfig, and the like. In one example, sensor 128 may be provisioned on a PFE 126 to collect and export data from the PFE 126 using command-line interface configuration or subscription calls. The collecting entity, such as an intermediary server and/or routing engine 122, may request data by initiating a telemetry subscription through a telemetry interface. Data from sensor 128 may be streamed periodically and/or in response to operational states or events and/or changes in states on the device. Examples of data collected by sensor 128 include, without limitation, physical interface statistics, health information for interfaces, performance information for interfaces, statuses of interfaces, firewall filter counter statistics, statistics for label-switched paths, combinations or variations of one or more of the same, and/or any other suitable data.

In some examples, PFE 126 may include one or more interfaces, such as interface 138. In one example, interface 138 may include and/or represent an egress interface out of which packets egress from the network device to the other devices within the network. Additionally or alternatively, interface 138 may include an ingress interface into which packets ingress to the network device from the other devices within the network.

Figure 2:
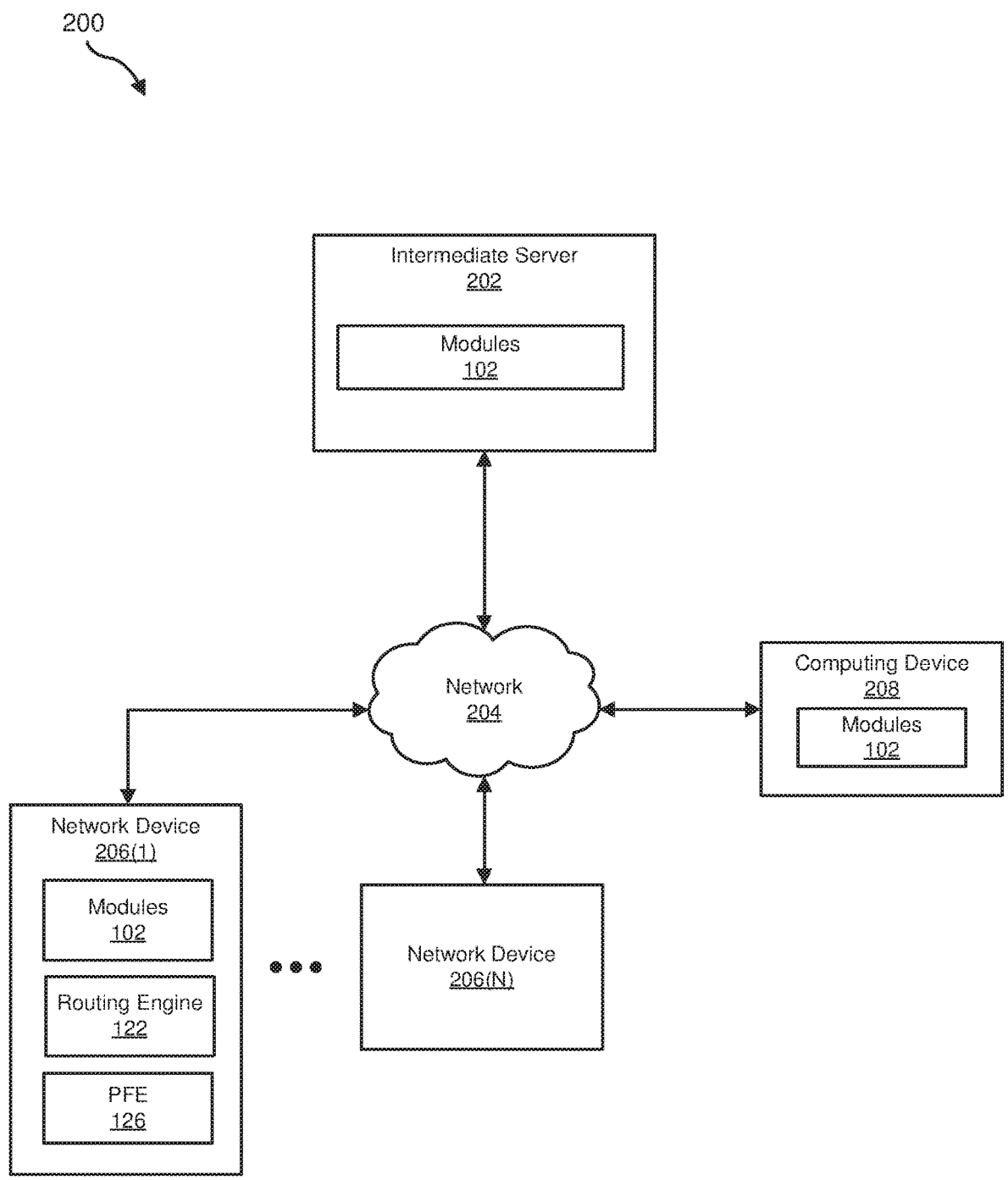
FIG. 2 is a block diagram of an exemplary system for replaying and debugging live states of network devices.

Example system 100 in FIG. 1 may be implemented in a variety of ways. For example, all or a portion of system 100 may represent portions of exemplary system 200 in FIG. 2. As shown in FIG. 2, system 200 may include one or more network devices 206(1)-(N), an intermediate server 202, and/or a computing device 208 in communication with one another via a network 204. As will be described in greater detail below, one or more of the components from FIG. 1 may, when executed by at least one processor, facilitate duplicate network issue flows with playback and/or debugging.

For example, and as will be described in greater detail below, network devices 206(1)-(N), intermediate server 202, and/or computing device 208 may replay and/or debug live states by (1) collecting telemetry data that represents a state of a network device during a live operating session, (2) deriving, from the telemetry data, a set of rules for reproducing the state of the network device during the live operating session, (3) generating, based at least in part on the set of rules, a playback decision tree that, upon execution, facilitates (A) reproducing the state of the network device during the live operating session and (B) debugging the state of the network device, and then (4) performing a debug operation that executes the playback decision tree.

Network devices 206(1)-(N) each generally represent any type or form of physical computing device that forwards traffic within a network and/or across networks. In one example, one or more of network devices 206(1)-(N) may include and/or represent a router, such as a Customer Edge (CE) router, a Provider Edge (PE) router, a hub router, a spoke router, an Autonomous System (AS) boundary router, and/or an area border router. Additional examples of network devices 206(1)-(N) include, without limitation, switches, hubs, modems, bridges, repeaters, gateways, network racks and/or chassis, servers, computers, laptops, desktops, portions of one or more of the same, combinations or variations of one or more of the same, and/or any other suitable network devices. In some examples, network devices 206(1)-(N) may include and/or implement one or more of modules 102, routing engine 122, and/or PFE 126. Additionally or alternatively, network devices 206(1)-(N) may include and/or implement memory 140 and/or physical processor 130.

Intermediate server 202 generally represents any type or form of physical computing device capable of reading computer-executable instructions, performing analyses on telemetry data, performing debug operations in connection with a network, and/or aggregating debug operations and/or actions. In one example, intermediate server 202 may include and/or represent a debugging device in a network diagnostic and/or debugging lab. Although illustrated as a single entity in FIG. 2, intermediate server 202 may include and/or represent a plurality of devices that work and/or operate in conjunction with one another. In some examples, intermediate server 202 may include and/or implement one or more of modules 102, memory 140, and/or physical processor 130.

Computing device 208 generally represents any type or form of physical computing device capable of reading computer-executable instructions and/or communicating with other devices. In one example, computing device 208 may include and/or represent a replay and/or debug device that belongs to and/or is operated by a service provider, network administrator, and/or developer. Additional examples of the computing device 208 include, without limitation, servers, router, laptops, tablets, desktops, servers, cellular phones, Personal Digital Assistants (PDAs), multimedia players, embedded systems, wearable devices (e.g., smart watches, smart glasses, etc.), gaming consoles, network devices, variations or combinations of one or more of the same, and/or any other suitable computing devices. Although illustrated as a single entity in FIG. 2, computing device 208 may include and/or represent a plurality of devices that work and/or operate in conjunction with one another. In some examples, computing device 208 may include and/or implement one or more of modules 102, memory 140, and/or physical processor 130.

Network 204 generally represents any medium or architecture capable of facilitating communication or data transfer. In one example, network 204 may facilitate communication among network devices 206(1)-(N), intermediate server 202, and/or computing device 208. In this example, network 204 may facilitate communication and/or data transfer using wireless and/or wired connections. Examples of network 204 include, without limitation, an intranet, a Wide Area Network (WAN), a Local Area Network (LAN), a Virtual LAN (ULAN), a Personal Area Network (PAN), the Internet, Power Line Communications (PLC), a cellular network (e.g., a Global System for Mobile Communications (GSM) network), a virtual network, portions of one or more of the same, variations or combinations of one or more of the same, and/or any other suitable network. Although network devices 206(1)-(N), intermediate server 202, and/or computing device 208 are illustrated as being external to network 204 in FIG. 2, one or more of these devices may alternatively represent part of and/or be included in the network 204.

Figure 3:
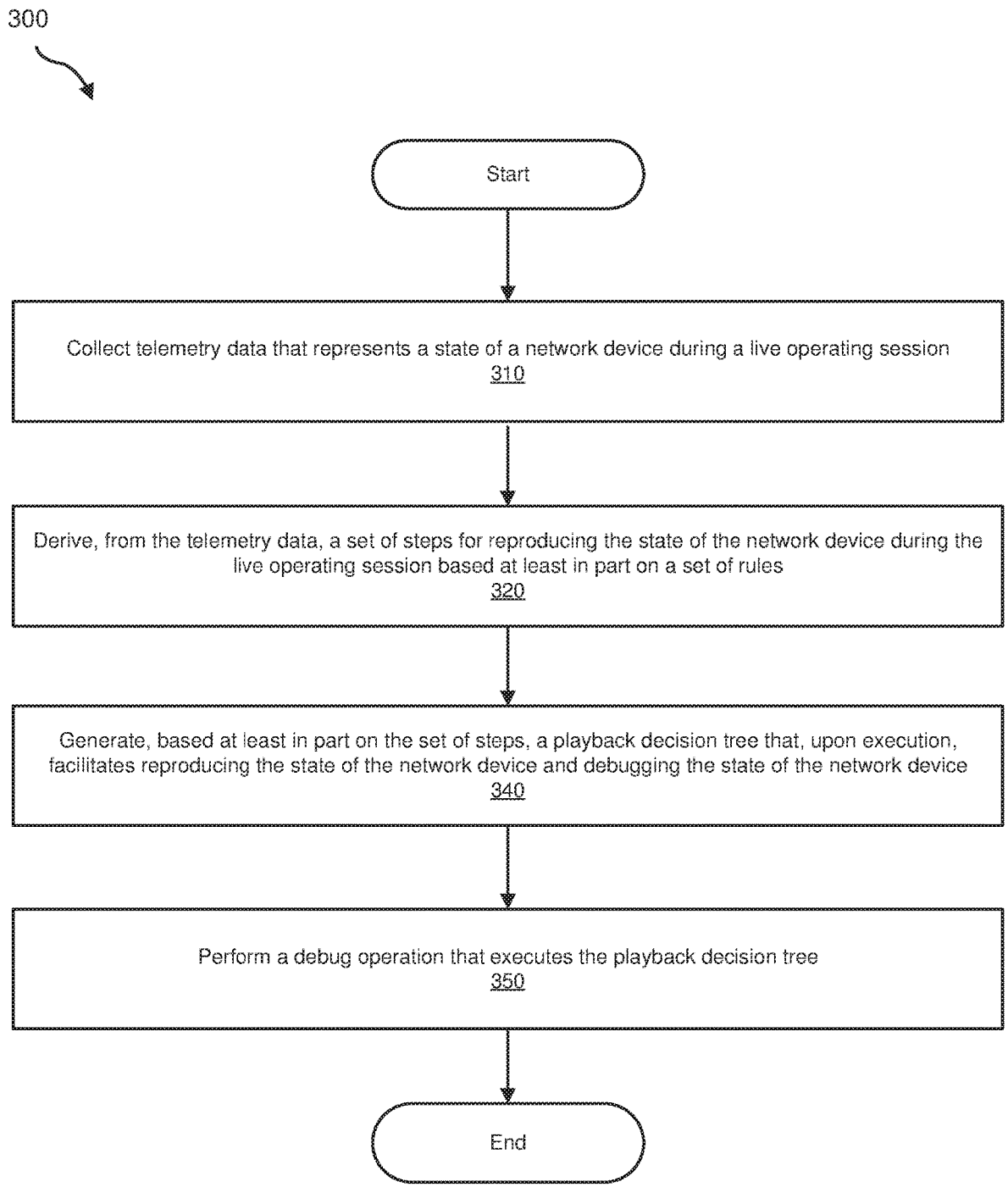
FIG. 3 is a flow diagram of an exemplary method for replaying and debugging live states of network devices.

FIG. 3 is a flow diagram of an exemplary computer-implemented method 300 for replaying and debugging live states of network devices. The steps shown in FIG. 3 may be performed by any suitable computer-executable code, computing system, and/or ASIC, including system 100 in FIG. 1, intermediate server 202, network devices 206(1)-(N), and/or computing device 208 in FIG. 2, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3 at step 310, one or more of the systems described herein may collect telemetry data that represents a state of a network device during a live operating session. For example, collection module 106 may, as part of network device 206(1), collect telemetry data that represents a state of network device 206(1) during a live operating session. The term "live operating session," as used herein, generally refers to an implementation and/or deployment in which a network device is actively servicing, handling, and/or forwarding network traffic. In this example, the live operating session may represent and/or correspond to a mode of operation in which network device 206(1) is deployed within a network and/or handles traffic within the network. Accordingly, the live operating session may be distinguished from a debugging session in which network device 206(1) undergoes debugging and/or diagnostics.

Examples of the telemetry data collected may include, without limitation, data aggregated over fixed time spans, data aggregated from multiple sources (e.g., different interfaces on PFE 126 of network device 206(1)), network topology data, environment data, configuration data, session data, event data, log files, application data, trace data, state data, combinations or variations of one or more of the same, and/or any other suitable telemetry data.

The systems described herein may perform step 310 in a variety of different ways and/or contexts. In some examples, collection module 106 may initiate collecting the telemetry data in response to a request from an administrator. For example, a user and/or an administrator may notice a color-coded alarm and/or indication about the state, performance, and/or health of network device 206(1) as issued or provided by a network diagnostic tool (such as a healthbot). In this example, in the event that the color-coded alarm and/or indication is red or yellow, the user and/or administrator may submit a request to initiate collecting telemetry data from network device 206(1) and/or its environment.

Additionally or alternatively, collection module 106 may initiate collecting the telemetry data in response to the detection of a triggering event. For example, detection module 104 may detect a triggering event on network device 206(1). Examples of such a triggering event include, without limitation, requests from an administrator, requests from routing engine 122, one or more pre-programmed rules, errors detected on a network device, a health metric associated with a network device, and/or a performance metric associated with a network device.

As specific example of a triggering event, detection module 104 may receive sensor data collected and/or reported by sensor 128 applied to interface 138. In this example, detection module 104 may determine that interface 138 is operating below a certain performance threshold based at least in part on the sensor data. Additionally or alternatively, detection module 104 may determine that the health of interface 138 is below a certain health threshold based at least in part on the sensor data. In response to either of these determinations, detection module 104 may direct collection module 106 to initiate collecting the telemetry data at a certain point in time, over a certain amount of time, and/or until a specific event occurs.

In some examples, subsequent instances of the triggering event may lead to and/or cause further telemetry data collection on network device 206(1) or another one of network devices 206(1)-(N). For example, detection module 104 may detect an additional instance of the same triggering event that led to the initiation of the telemetry data collection. In response to the detection of this additional instance of the same triggering event, detection module 104 may direct collection module 106 to initiate collecting the telemetry data at a certain point in time, over a certain amount of time, and/or until a specific event occurs.

In one example, collection module 106 may collect at least a portion of the telemetry data from various sensors that monitor interfaces incorporated on PFE 126 of network device 206(1). In this example, the portion of the telemetry data may indicate that one or more of those interfaces are operating below a certain performance threshold. Additionally or alternatively, the portion of the telemetry data may indicate that one or more of those interfaces is exhibiting poor health and/or faulting.

Figure 4:
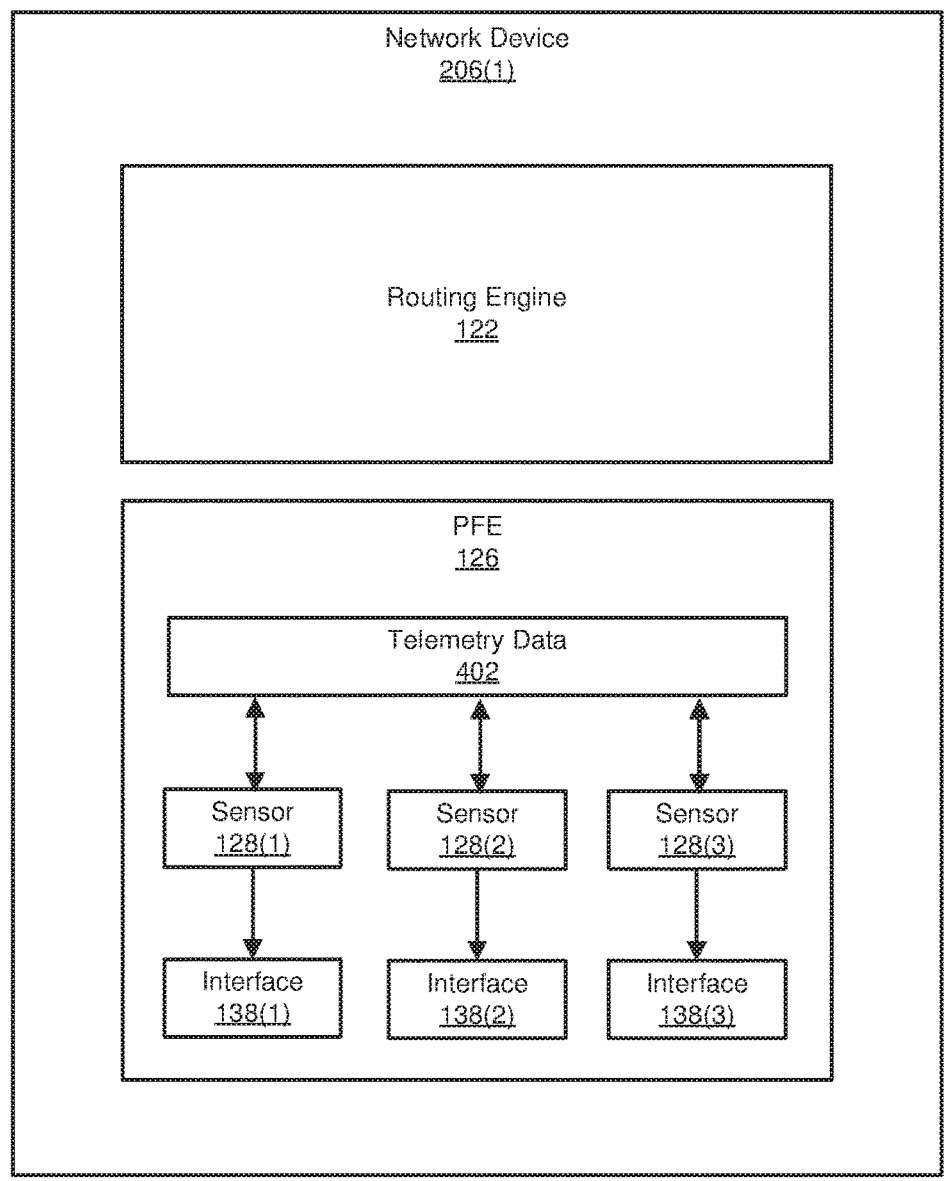
FIG. 4 is a block diagram of an exemplary implementation of at least a portion of a system for replaying and debugging live states of network devices.

As a specific example illustrated in FIG. 4, collection module 106 may collect telemetry data 402 from sensors 128(1), 128(2), and/or 128(3). In this example, sensors 128(1)-(3) may be applied to and/or monitor interfaces 138(1), 138(2), and/or 138(3), respectively, on PFE 126. The combination of sensors, interfaces, and/or collection module 106 may carry out and/or perform a collection phase in which telemetry data 402 is assembled and/or aggregated.

Returning to FIG. 3 at step 320, one or more of the systems described herein may derive, from the telemetry data, a set of steps for reproducing the state of the network device during the live operating session based at least in part on a set of rules. For example, analysis module 108 may, as part of network device 206(1) and/or intermediate server 202, derive a set of steps from the telemetry data based at least in part on a set of rules. In this example, the set of steps may facilitate and/or be configured for reproducing one or more states of network device 206(1) during the live operating session. Additionally or alternatively, the set of rules may be included in and/or represented as playbook 120.

The systems described herein may perform step 320 in a variety of different ways and/or contexts. In some examples, analysis module 108 may filter the telemetry data for information that is relevant to a technical problem and/or suspicious activity that is impairing network device 206(1). In one example, analysis module 108 may apply the set of rules to the telemetry data to identify and/or detect various states of network device 206(1) over a period of time during the live operating session. Additionally or alternatively, analysis module 108 may apply the set of rules to the telemetry data to identify and/or detect multiple state changes of network device 206(1).

In some examples, analysis module 108 may identify and/or detect one or more events that transpired on network device 206(1) around the same time as those state changes based at least in part on the telemetry data. Accordingly, analysis module 108 may determine, conclude, and/or assume that those events led to and/or caused those state changes due at least in part to having coincided with one another temporally on network device 206(1). For example, analysis module 108 may search the telemetry data for certain parameters, configuration settings, and/or metadata of network device 206(1) at a certain point in time during the live operating session. During this search, analysis module 108 may identify and/or find certain evidence indicative of those parameters, settings, and/or metadata in topology data, environmental data, configuration data, live session data, log files, and/or trace files obtained from network device 206(1) and/or PFE 126.

In some examples, analysis module 108 may create and/or define playbook 120 with certain rules to analyze and/or filter the telemetry data. In one example, analysis module 108 may create and/or define multiple playbooks that each include rules for analyzing and/or filtering certain components and/or portions of the telemetry data (e.g., topology data, environmental data, configuration data, live session data, log files, trace files, etc.). In some embodiments, one or more of the rules included in such playbooks may be user-defined.

Additionally or alternatively, analysis module 108 may create, define, and/or modify playbook 120 based at least in part on the telemetry data. For example, analysis module 108 may add one or more rules to playbook 120 to account for certain features identified in the telemetry data. In another example, analysis module 108 may modify one or more existing rules included in playbook 120 to account for certain features identified in the telemetry data.

In one embodiment, analysis module 108 may be incorporated into routing engine 122 of network device 206(1) and/or perform the deriving processes on routing engine 122. In another embodiment, analysis module 108 may be incorporated into intermediate server 202 and/or perform the deriving processes on intermediate server 202.

Figure 5:
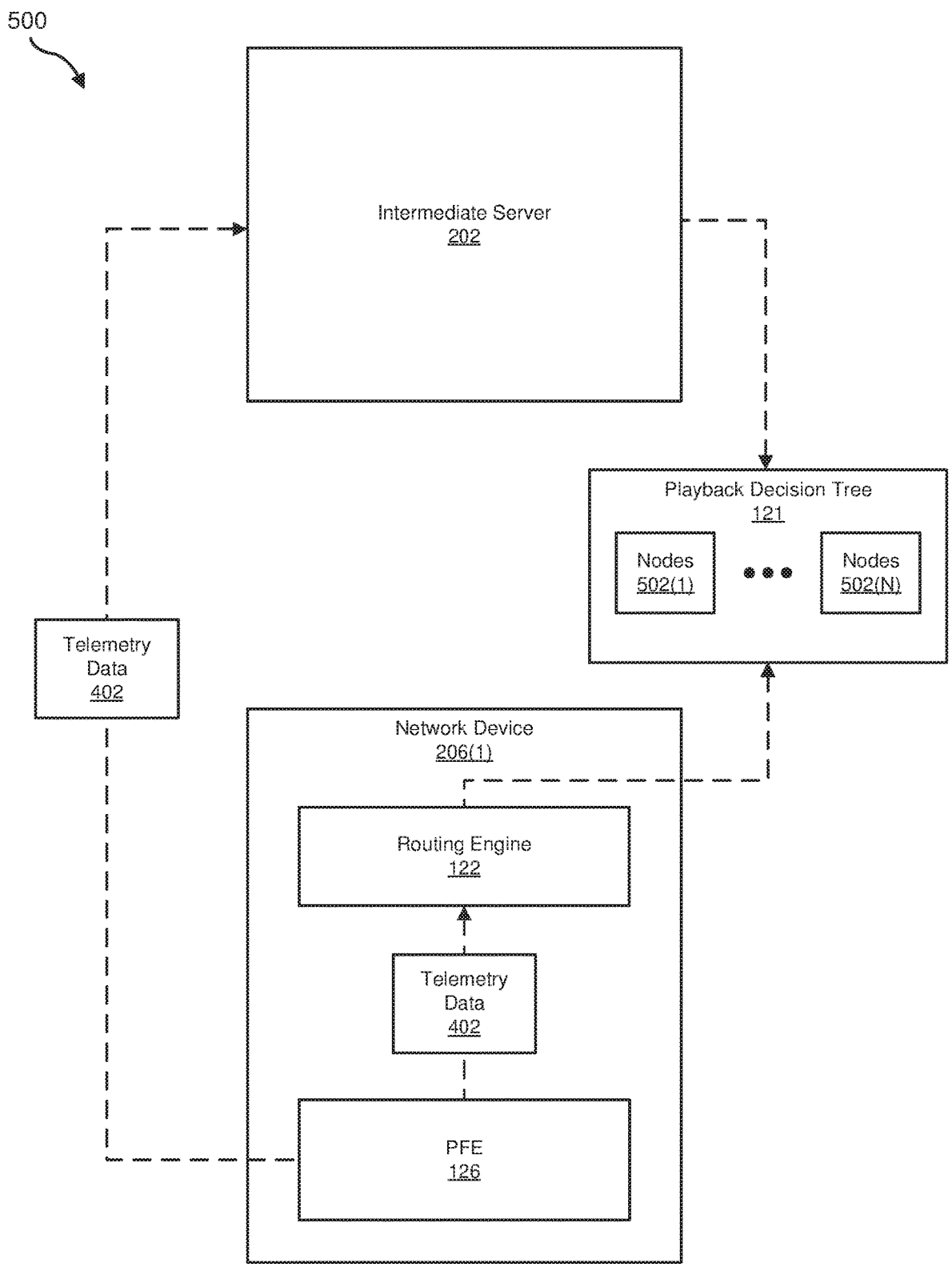
FIG. 5 is a block diagram of an exemplary implementation of at least a portion of a system for replaying and debugging live states of network devices.

As a specific example illustrated in FIG. 5, analysis module 108 may analyze and/or filter telemetry data 402 collected from sensors 128(1), 128(2), and/or 128(3) on PFE 126. In some examples, analysis module 108 may obtain telemetry data 402 from collection module 106. In one example, PFE 126 may provide telemetry data 402 to routing engine 122 and/or intermediate server 202 for analysis.

In some examples, analysis module 108 may carry out an analysis phase in which telemetry data 402 is analyzed and/or from which the set of steps for reproducing the state of network device 206(1) are derived. In one example, the analysis phase may be performed by routing engine 122. In another example, the analysis phase may be performed by intermediate server 202.

Returning to FIG. 3 at step 330, one or more of the systems described herein may generate, based at least in part on the set of steps, a playback decision tree that, upon execution, facilitates reproducing the state of the network device and/or debugging the state of the network device. For example, analysis module 108 may, as part of network device 206(1) and/or intermediate server 202, generate playback decision tree 121 based at least in part on the set of steps derived from the telemetry data. Upon execution, playback decision tree 121 may be able to reproduce one or more states and/or state changes experienced by network device 206(1) during the live operating session. Additionally or alternatively, playback decision tree 121 may enable a debugger, a developer, and/or an administrator to debug and/or diagnose network device 206(1) in view of those reproduced states and/or state changes.

The systems described herein may perform step 330 in a variety of different ways and/or contexts. In some examples, analysis module 108 may generate a plurality of nodes that represent different states and/or state changes of network device 206(1) during the live operating session. In such examples, analysis module 108 may assemble those nodes into playback decision tree 121. In one example, each node within playback decision tree 121 may include various metadata about the corresponding state of network device 206(1). For example, analysis module 108 may derive the metadata from the telemetry data obtained from network device 206(1). In this example, the metadata may represent and/or facilitate the reproduction of the corresponding state of network device 206(1) based at least in part on the topology data, environmental data, configuration data, live session data, log files, and/or trace files obtained from network device 206(1).

In some examples, upon execution by a computing device, playback decision tree 121 may cause the computing device to implement each state represented by the various nodes. In one example, the debugger, developer, and/or administrator may be able to switch back and forth among the states represented by the various nodes by directing playback decision tree 121 to move to the previous node and/or advance to the next node. By doing so, the debugger, developer, and/or administrator may be able to examine the state changes experienced by network device 206(1) during the live operating session, identify the underlying cause of bad health or poor performance, and/or remedy network device 206(1) by addressing the underlying cause.

Additionally or alternatively, playback decision tree 121 may facilitate predicting future system faults on network device 206(1) and/or other network devices based at least in part on the various nodes. For example, the nodes of playback decision tree 121 may form and/or establish various paths representative of state changes experienced by network device 206(1). In one example, detection module 104 may detect an additional instance of the triggering event that led to the data collection on network device 206(1) and/or another network. In response to this additional instance of the triggering event, collection module 106 may collect additional telemetry data. Analysis module 108 may then analyze this additional telemetry data and/or apply playback decision tree 121 on this additional telemetry data to predict future behavior of the corresponding network device.

In the event that playback decision tree 121 includes one or more nodes that represent one or more states beyond and/or past the one currently experienced by the corresponding network device, analysis module 108 and/or debug module 110 may be able to predict one or more future events on that network device by comparing the trend of that network device to the states represented in playback decision tree 121. In other words, analysis module 108 and/or debug module 110 may track the trending behavior of the corresponding network device relative to the past trends and/or behavior represented in and/or detected via playback decision tree 121. Additionally or alternatively, a debugger, a developer, and/or an administrator may step through playback decision tree 121 to compare and/or examine the trending behavior of the corresponding network device relative to the past trends and/or behavior represented in and/or detected via playback decision tree 121.

Returning to the specific example illustrated in FIG. 5, analysis module 108 may generate playback decision tree 121 from the set of steps for reproducing the state of network device 206(1). In some examples, playback decision tree 121 may include and/or represent nodes 502(1)-(N) arranged in a tree data structure. In one example, node 502(1) may correspond to and/or represent a specific state that network device 206(1) experienced during the live operating session. In this example, node 502(N) may correspond to and/or represent a different state that network device 206(1) experienced during the live operating session.

Continuing with this example, node 502(1) may correspond to and/or represent a stable or high-performing state of network device 206(1), and node 502(N) may correspond to and/or represent an unstable or low-performing state of network device 206(N). In one example, one or more events that occurred on network device 206(1) during the live operating session may have led and/or caused the stable or high-performing state to change to and/or become the unstable or low-performing state. Accordingly, upon execution, playback decision tree 121 may enable debug module 110 to reproduce any of the states represented by nodes 502(1)-(N) during a debug operation.

In addition, debug module 110 may be able to detect and/or identify the events that led and/or caused the stable or high-performing state to change to and/or become the unstable or low-performing state during the debug operation. In other words, debug module 110 may determine that those events detected during the debug operation led and/or caused network device 206(1) to change from one state to another during the live operating session. Additionally or alternatively, a debugger, a developer, and/or an administrator may step through playback decision tree 121 during the debug operation to detect and/or identify those events that led and/or caused network device 206(1) to change from one state to another.

In some examples, analysis module 108 may carry out a generation phase in which playback decision tree 121 is generated from the set of steps derived from telemetry data 402. In one example, the generation phase may be performed by routing engine 122. In another example, the generation phase may be performed by intermediate server 202.

Figure 6:
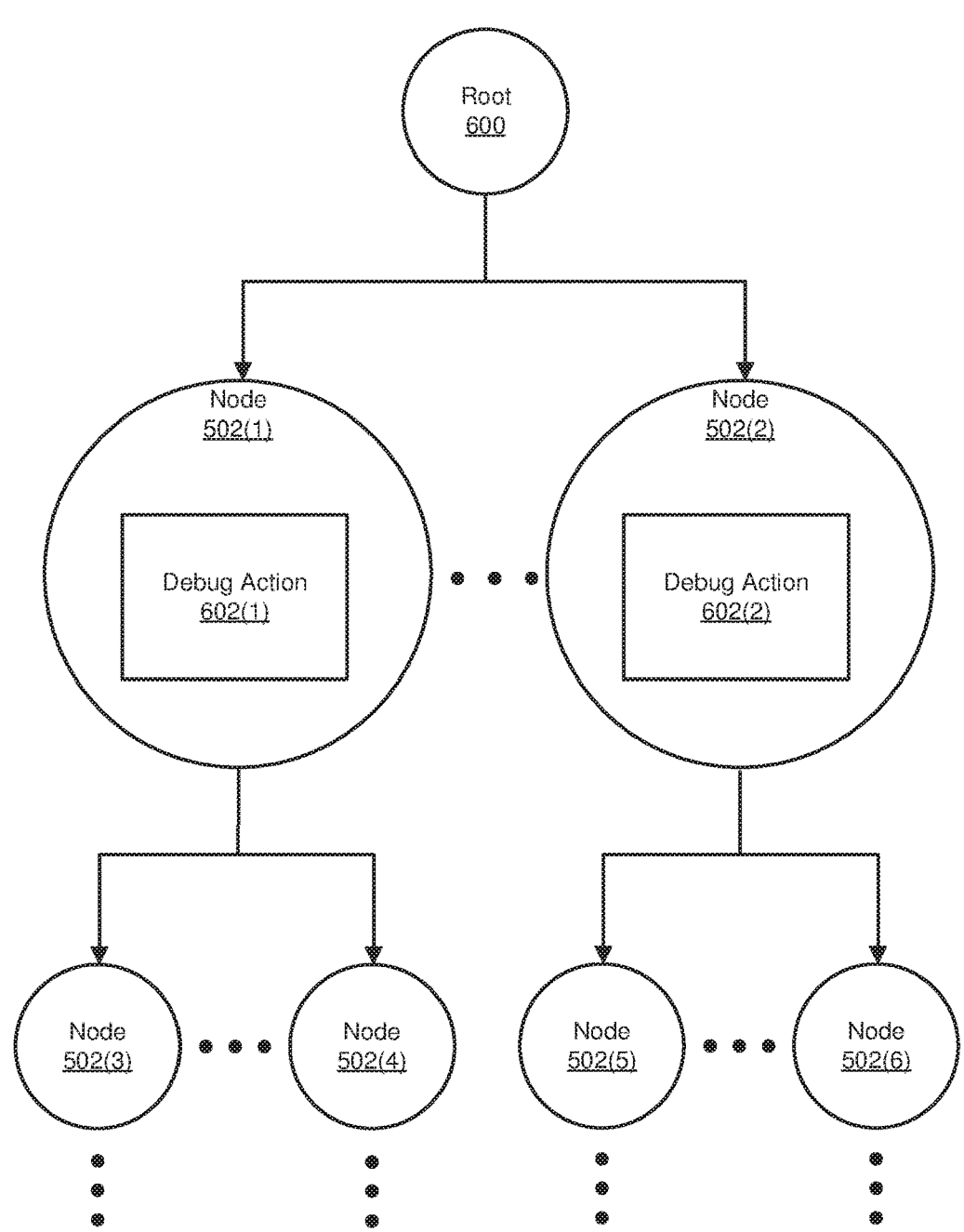
FIG. 6 is an illustration of an exemplary playback decision tree that facilitates replaying and debugging live states of network devices.
Figure 7:
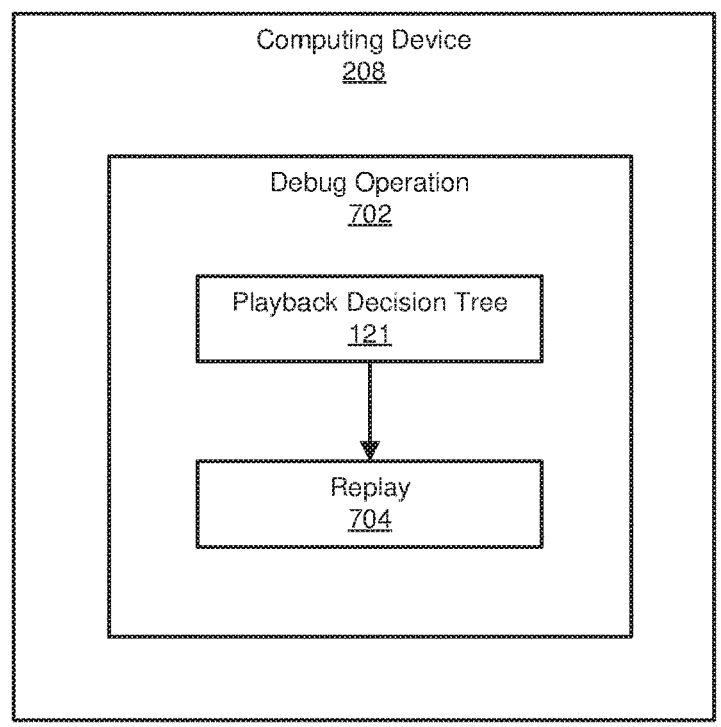
FIG. 7 is a block diagram of an exemplary implementation of at least a portion of a system for replaying and debugging live states of network devices.

As a specific example illustrated in FIG. 6, playback decision tree 121 may include various nodes that correspond to and/or represent certain states of network device 206(1) during the live operating session. For example, playback decision tree 121 may include a root 600 and nodes 502(1), 502(2), 502(3), 502(4), 502(5), and 502(6) (and potentially more that are not explicitly illustrated in FIG. 6). In one example, root 600 may mark and/or represent the starting point for traversing playback decision tree 121 from one state to another in a debug session.

In some examples, one or more of nodes 502(1)-(6) may include various metadata associated with the corresponding states. In one example, such metadata may include and/or represent various configuration and/or environmental settings or information needed to reproduce the corresponding states. Additionally or alternatively, such metadata may include and/or represent behavioral prediction indicators that facilitate predicting future trends, events, faults, and/or behaviors based at least in part on historical trends, events, faults, and/or behaviors.

In some examples, one or more of nodes 502(1)-(6) may include and/or identify certain debug actions to be performed in connection with playback decision tree 121. As illustrated in FIG. 6, node 502(1) may include and/or identify a debug action 602(1), and node 502(2) may include and/or identify a debug action 602(2). For example, upon traversing node 502(1), debug module 110 may execute and/or perform debug action 602(1) to facilitate debugging the state of network device 206(1) and/or remedying certain problems with the state of network device 206(1). Similarly, upon traversing node 502(2), debug module 110 may execute and/or perform debug action 602(2) to facilitate debugging the state of network device 206(1) and/or remedying certain problems with the state of network device 206(1).

Examples of debug actions 602(1)-(2) include, without limitation, shutting down and/or rebooting all or portions of network device 206(1), shutting down and/or rebooting one or more applications or processes running on network device 206(1), shutting down and/or rebooting PFE 126, shutting down and/or rebooting one or more interfaces of PFE 126, rerouting and/or redirecting network traffic, notifying an administrator of one or more features and/or problems with the state of network device 206(1), notifying another network device of one or more features and/or problems with the state of network device 206(1), combinations or variations of one or more of the same, and/or any other suitable debug actions.

Debug actions 602(1)-(2) may be determined and/or identified in a variety of ways and/or contexts. In one example, analysis module 108 may monitor certain debug actions performed in connection with a debug operation or session that involves playback decision tree 121. In this example, analysis module 108 may add debug actions 602(1)-(2) to nodes 502(1)-(2), respectively, as metadata. By doing so, analysis module 108 may be able to account for and/or perform debug actions 602(1) in future debugging operations and/or sessions. Accordingly, playback decision tree 121 may evolve and/or be modified over time based at least in part on past debugging operations and/or sessions.

Returning to FIG. 3 at step 340, one or more of the systems described herein may perform a debug operation that executes the playback decision tree. For example, debug module 110 may, as part of network device 206(1), intermediate server 202, and/or computing device 208, perform a debug operation that executes playback decision tree 121. In one example, this debug operation may involve reproducing the state experienced by network device 206(1) during the live operating session. Additionally or alternatively, this debug operation may involve debugging the state experienced by network device 206(1) via playback decision tree 121.

The systems described herein may perform step 340 in a variety of different ways and/or contexts. In some examples, debug module 110 may execute playback decision tree 121 to traverse through and/or simulate certain states of network device 206(1). By doing so, debug module 110 may effectively reproduce such states for the purpose of debugging and/or formulating a remedy for network device 206(1). This reproduction of such states may sometimes be referred to as a "replay."

In some examples, debug module 110 may perform the debug operation in any of the ways described above in connection with FIGS. 5 and 6. For example, in the event that the debugging operation calls for traversing playback decision tree 121 down the path of node 502(1), debug module 110 may apply and/or implement the state of network device 206(1) represented by metadata included in and/or associated with node 502(1). In this example, debug module 110 may also perform and/or execute debug action 602(1).

In some examples, collection module 106 may record certain debug actions taken during the debugging operation. In such examples, analysis module 108 may modify playbook 120 and/or playback decision tree 121 to account for those debug actions. In one example, analysis module 108 may repeat one or more of these modification procedures on multiple occasions (e.g., during multiple debugging sessions) such that playback decision tree 121 evolves over time and/or becomes highly specialized for debugging and/or remedying the underlying cause of an afflicted network device's poor health and/or performance.

In some examples, debug module 110 may carry out a debug phase in which playback decision tree 121 is executed to replay the state of network device 206(1) and/or debug the underlying cause of the network device's affliction. In one example, the debug phase may be performed by a computing device other than network device 206(1) whose state is undergoing debugging and/or diagnostics. In this example, routing engine 122 and/or intermediate server 202 may provide playback decision tree 121 to computing device 208. As a specific example illustrated in FIG. 7, computing device 208 may implement a debugging operation 702 in which playback decision tree 121 is executed. In debugging operation 702, computing device 208 may perform a replay 704 of the state of network device 206(1) that is undergoing debugging and/or diagnostics.

In some examples, debug module 110 may identify a problem with the state of network device 206(1) during the debugging operation. In such examples, remedy module 112 may, as part of network device 206(1), intermediate server 202, and/or computing device 208, remedy the problem with the state of network device 206(1). In one example, analysis module 108 and/or remedy module 112 may modify playback decision tree 121 to account for the remedy. For example, analysis module 108 and/or remedy module 112 may add the remedy to a certain node included in playback decision tree 121 as metadata. As a result, the remedy may be used to address the problem in connection with future debugging sessions associated with the same underlying cause.

Examples of such a remedy include, without limitation, shutting down and/or rebooting all or portions of network device 206(1), shutting down and/or rebooting one or more applications or processes running on network device 206(1), shutting down and/or rebooting PFE 126, shutting down and/or rebooting one or more interfaces of PFE 126, rerouting and/or redirecting network traffic, notifying an administrator of one or more features and/or problems with the state of network device 206(1), notifying another network device of one or more features and/or problems with the state of network device 206(1), combinations or variations of one or more of the same, and/or any other suitable remedies.

Figure 8:
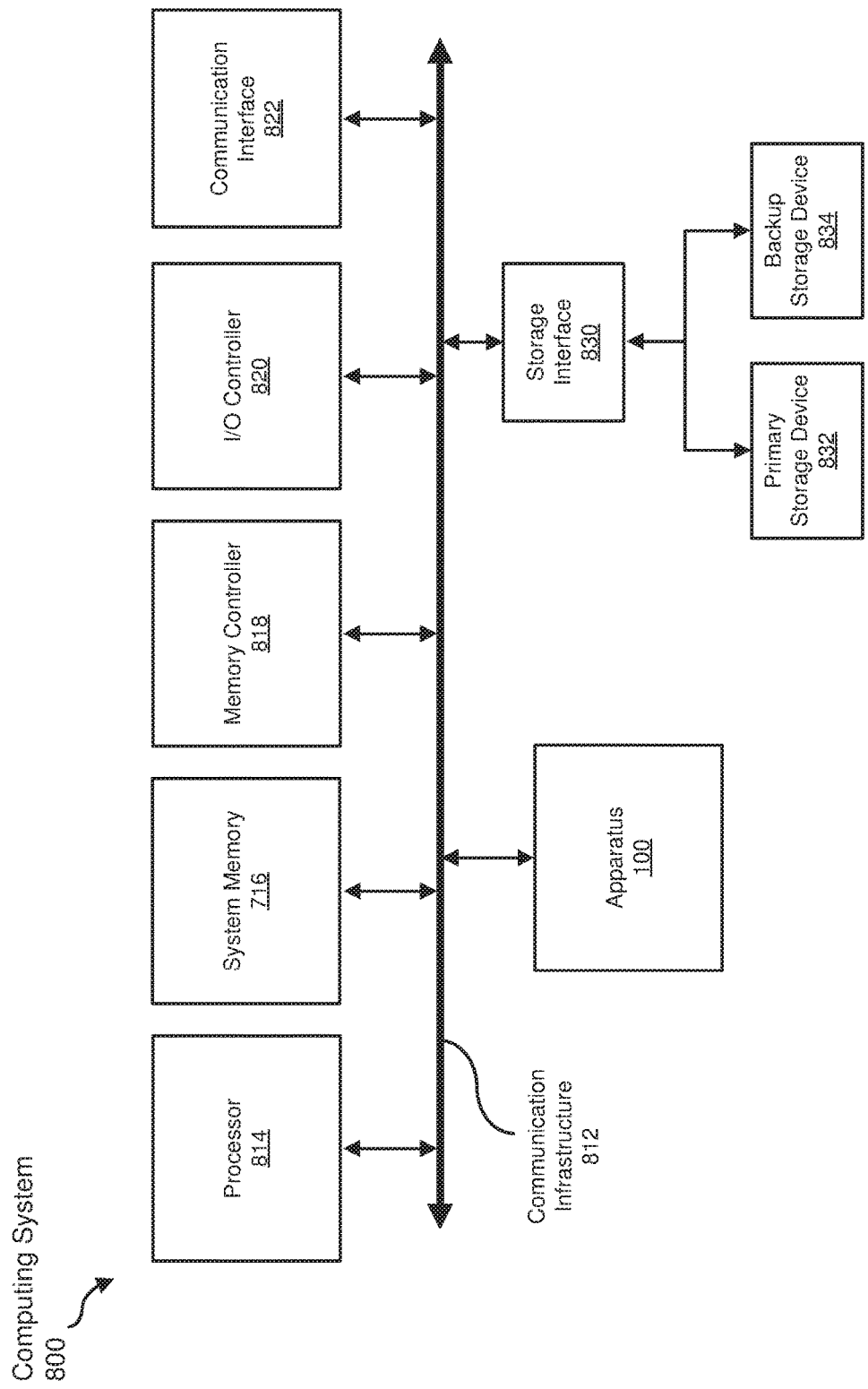
FIG. 8 is a block diagram of an exemplary computing system capable of implementing and/or being used in connection with one or more of the embodiments described and/or illustrated herein.

FIG. 8 is a block diagram of an exemplary computing system 800 capable of implementing and/or being used in connection with one or more of the embodiments described and/or illustrated herein. In some embodiments, all or a portion of the computing system 800 may perform and/or be a means for performing, either alone or in combination with other elements, one or more of the steps described in connection with FIG. 3. All or a portion of the computing system 800 may also perform and/or be a means for performing and/or implementing any other steps, methods, or processes described and/or illustrated herein. In one example, the computing system 800 may include, represent, and/or implement the exemplary system 100 from FIG. 1.

The computing system 800 broadly represents any type or form of electrical load, including a single or multi-processor computing device or system capable of executing computer-readable instructions. Examples of the computing system 800 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

The computing system 800 may be programmed, configured, and/or otherwise designed to comply with one or more networking protocols. According to certain embodiments, the computing system 800 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, the computing system 800 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

The computing system 800 may include various network and/or computing components. For example, the computing system 800 may include at least one processor 814 and a system memory 816. The processor 814 generally represents any type or form of processing unit capable of processing data or interpreting and executing instructions. For example, the processor 814 may represent an application-specific integrated circuit (ASIC), a system on a chip (e.g., a network processor), a hardware accelerator, a general-purpose processor, and/or any other suitable processing element.

The processor 814 may process data according to one or more of the networking protocols discussed above. For example, the processor 814 may execute or implement a portion of a protocol stack, may process packets, may perform memory operations (e.g., queuing packets for later processing), may execute end-user applications, and/or may perform any other processing tasks.

The system memory 816 generally represents any type or form of volatile or non-volatile storage device or medium capable of storing data and/or other computer-readable instructions. Examples of the system memory 816 include, without limitation, Random Access Memory (RAM), Read Only Memory (ROM), flash memory, or any other suitable memory device. Although not required, in certain embodiments, the computing system 800 may include both a volatile memory unit (such as, for example, the system memory 816) and a non-volatile storage device (such as, for example, the primary storage device 832, as described in detail below). The system memory 816 may be implemented as shared memory and/or distributed memory in a network device. Furthermore, the system memory 816 may store packets and/or other information used in networking operations.

In certain embodiments, the exemplary computing system 800 may also include one or more components or elements in addition to the processor 814 and the system memory 816. For example, as illustrated in FIG. 8, the computing system 800 may include a memory controller 818, an Input/Output (I/O) controller 820, and a communication interface 822, each of which may be interconnected via the communication infrastructure 812. The communication infrastructure 812 generally represents any type or form of infrastructure capable of facilitating communication between one or more components of a computing device. Examples of the communication infrastructure 812 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

The memory controller 818 generally represents any type or form of device capable of handling memory or data or controlling communication between one or more components of the computing system 800. For example, in certain embodiments, the memory controller 818 may control communication between the processor 814, the system memory 816, and the I/O controller 820 via the communication infrastructure 812. In some embodiments, the memory controller 818 may include a Direct Memory Access (DMA) unit that may transfer data (e.g., packets) to or from a link adapter.

The I/O controller 820 generally represents any type or form of device or module capable of coordinating and/or controlling the input and output functions of a computing device. For example, in certain embodiments, the I/O controller 820 may control or facilitate transfer of data between one or more elements of the computing system 800, such as the processor 814, the system memory 816, the communication interface 822, and the storage interface 830.

The communication interface 822 broadly represents any type or form of communication device or adapter capable of facilitating communication between the exemplary computing system 800 and one or more additional devices. For example, in certain embodiments, the communication interface 822 may facilitate communication between the computing system 800 and a private or public network including additional computing systems. Examples of the communication interface 822 include, without limitation, a link adapter, a wired network interface (such as a network interface card), a wireless network interface (such as a wireless network interface card), and any other suitable interface. In at least one embodiment, the communication interface 822 may provide a direct connection to a remote server via a direct link to a network, such as the Internet. The communication interface 822 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, the communication interface 822 may also represent a host adapter configured to facilitate communication between the computing system 800 and one or more additional network or storage devices via an external bus or communications channel. Examples of the host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 822 may also enable the computing system 800 to engage in distributed or remote computing. For example, the communication interface 822 may receive instructions from a remote device or send instructions to a remote device for execution.

As illustrated in FIG. 8, the exemplary computing system 800 may also include a primary storage device 832 and/or a backup storage device 834 coupled to the communication infrastructure 812 via a storage interface 830. The storage devices 832 and 834 generally represent any type or form of storage device or medium capable of storing data and/or other computer-readable instructions. For example, the storage devices 832 and 834 may represent a magnetic disk drive (e.g., a so-called hard drive), a solid state drive, a floppy disk drive, a magnetic tape drive, an optical disk drive, a flash drive, or the like. The storage interface 830 generally represents any type or form of interface or device for transferring data between the storage devices 832 and 834 and other components of the computing system 800.

In certain embodiments, the storage devices 832 and 834 may be configured to read from and/or write to a removable, storage unit configured to store computer software, data, or other computer-readable information. Examples of suitable removable storage units include, without limitation, a floppy disk, a magnetic tape, an optical disk, a flash memory device, or the like. The storage devices 832 and 834 may also include other similar structures or devices for allowing computer software, data, or other computer-readable instructions to be loaded into the computing system 800. For example, the storage devices 832 and 834 may be configured to read and write software, data, or other computer-readable information. The storage devices 832 and 834 may be a part of the computing system 800 or may be separate devices accessed through other interface systems.

Many other devices or subsystems may be connected to the computing system 800. Conversely, all of the components and devices illustrated in FIG. 8 need not be present to practice the embodiments described and/or illustrated herein. The devices and subsystems referenced above may also be interconnected in different ways from those shown in FIG. 8. The computing system 800 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of the system 100 in FIG. 1 may represent portions of a cloud-computing or network-based environment. Cloud-computing and network-based environments may provide various services and applications via the Internet. These cloud computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    collecting telemetry data that represents a state of a network device during a live operating session;
    deriving, from the telemetry data, a set of steps for reproducing the state of the network device during the live operating session based at least in part on a set of rules;
    generating, based at least in part on the set of steps, a playback decision tree that, upon execution, facilitates:
        reproducing the state of the network device during the live operating session; and
        debugging the state of the network device; and
    performing a debug operation that executes the playback decision tree.

2. The method of claim 1, wherein reproducing the state of the network device comprises reproducing, on a different computing device, the state of the network device during the live operating session.

3. The method of claim 1, further comprising detecting a triggering event on the network device at a certain point in time; and
    wherein collecting the telemetry data comprises collecting the telemetry data in response to detecting the triggering event.

4. The method of claim 3, wherein the triggering event comprises at least one of:
    a request from an administrator;
    an error detected on the network device;
    one or more pre-programmed rules;
    a health metric associated with the network device; and
    a performance metric associated with the network device.

5. The method of claim 3, further comprising detecting an additional instance of the triggering event at an additional point in time; and
    wherein collecting the telemetry data comprises collecting at least a portion of the telemetry data in response to detecting the additional instance of the triggering event.

6. The method of claim 5, further comprising performing an additional debug operation that executes the playback decision tree in connection with the additional instance of the triggering event.

7. The method of claim 1, wherein executing the playback decision tree comprises reproducing the state of the network device during the debug operation by:
    reproducing a stable state of the network device;
    detecting an event that occurs during the debug operation; and
    determining that the event caused the network device to change from the stable state to an unstable state.

8. The method of claim 1, wherein generating the playback decision tree comprises:
    generating a plurality of nodes that represent different states of the network device during the live operating session; and
    assembling the plurality of nodes into the playback decision tree.

9. The method of claim 8, further comprising predicting a future system fault based at least in part on the plurality of nodes assembled into the playback decision tree.

10. The method of claim 1, wherein collecting the telemetry data comprises collecting the telemetry data from a plurality of sensors that monitor a plurality of interfaces incorporated on a forwarding engine of the network device.

11. The method of claim 1, wherein performing the debug operation comprises:
    identifying a problem with the state of the network device by executing the playback decision tree; and
    remedying the problem with the state of the network device via a network diagnostic tool.

12. The method of claim 1, wherein the telemetry data comprises at least one of:
    network topology data associated with the network device;
    environment data of the network device;
    configuration data of the network device;
    session data of the network device;
    event data of the network device;
    log files of the network device; and
    trace data of the network device.

13. The method of claim 1, wherein the live operating session comprises a mode of operation in which the network device is deployed within a network and handles traffic within the network.

14. The method of claim 1, further comprising:
    recording one or more debug actions taken during the debug operation; and
    adding the debug actions to one or more nodes included in the playback decision tree to account for the debug actions in future debugging operations.

15. The method of claim 1, further comprising:
modifying the playback decision tree based at least in part on the debug operation; and
performing an additional debug operation that executes the modified playback decision tree.

16. A system comprising:
a collection module, stored in memory, that collects telemetry data that represents a state of a network device during a live operating session;
an analysis module, stored in memory, that:
  derives, from the telemetry data, a set of steps for reproducing the state of the network device during the live operating session based at least in part on a set of rules;
  generates, based at least in part on the set of steps, a playback decision tree that, upon execution, facilitates:
    reproducing the state of the network device during the live operating session; and
    debugging the state of the network device; and
a debug module, stored in memory, that performs a debug operation that executes the playback decision tree; and
at least one physical processor configured to execute the collection module, the analysis module, and the debug module.

17. The system of claim 16, wherein, to perform the debug operation, the debug module reproduces, on a different computing device, the state of the network device during the live operating session.

18. The system of claim 16, further comprising a detection module, stored in memory, that detects a triggering event on the network device at a certain point in time; and
  wherein the collection module collects at least a portion of the telemetry data in response to detecting the triggering event.

19. The system of claim 18, wherein the triggering event comprises at least one of:
a request from an administrator;
an error detected on the network device;
one or more pre-programmed rules;
a health metric associated with the network device; and
a performance metric associated with the network device.

20. A non-transitory computer-readable medium comprising one or more computer-readable instructions that, when executed by at least one processor of a computing device, cause the computing device to:
collect telemetry data that represents a state of a network device during a live operating session;
derive, from the telemetry data, a set of steps for reproducing the state of the network device during the live operating session based at least in part on a set of rules;
generate, based at least in part on the set of steps, a playback decision tree that, upon execution, facilitates:
  reproducing the state of the network device during the live operating session; and
  debugging the state of the network device; and
perform a debug operation that executes the playback decision tree.

\* \* \* \* \*